United States Patent
Jang et al.

(10) Patent No.: US 7,695,000 B2
(45) Date of Patent: Apr. 13, 2010

(54) BRACKET FOR SECURING SIDE AIRBAG FOR AUTOMOTIVE VEHICLE

(75) Inventors: Myung-ryun Jang, Suwon-si (KR); Byoung-sun Yoo, Seoul (KR); Tae-woo Kim, Wonju-si (KR); Dong-jun Lee, Wonju-si (KR); Eun-hwan Oh, Wonju-si (KR); Kyun-soon Choi, Jeonju-si (KR)

(73) Assignee: Delphi Korea Corporation, Troy, MI (US)

( * ) Notice: Subject to any disclaimer, the term of this patent is extended or adjusted under 35 U.S.C. 154(b) by 0 days.

(21) Appl. No.: 12/283,015

(22) Filed: Sep. 9, 2008

(65) Prior Publication Data

US 2009/0072521 A1   Mar. 19, 2009

Related U.S. Application Data

(62) Division of application No. 11/717,423, filed on Mar. 13, 2007.

(30) Foreign Application Priority Data

| Mar. 14, 2006 | (KR) | 20-2006-0006828 |
| Mar. 17, 2006 | (KR) | 20-2006-0007230 |
| Mar. 27, 2006 | (KR) | 20-2006-0008135 |
| Apr. 18, 2006 | (KR) | 20-2006-0010369 |
| Apr. 20, 2006 | (KR) | 20-2006-0010629 |

(51) Int. Cl.
  *B60R 21/213* (2006.01)
  *B60R 21/217* (2006.01)
(52) U.S. Cl. .................. 280/728.2; 24/265 R
(58) Field of Classification Search .......... 280/728.2, 280/730.2; 24/289, 291, 292, 297, 295, 265 A, 24/265 AL, 265 R; 248/201, 500, 503, 505; 411/175
See application file for complete search history.

(56) References Cited

U.S. PATENT DOCUMENTS

| 1,354,165 | A | * | 9/1920  | Brooks ............... 292/325 |
| 1,549,142 | A | * | 8/1925  | McKenzie et al. ....... 24/457 |
| 2,781,569 | A | * | 2/1957  | Eilertsen .............. 24/487 |
| 4,257,570 | A | * | 3/1981  | Rasmussen ............ 248/503 |
| 5,103,537 | A | * | 4/1992  | Snyder et al. .......... 24/198 |
| 5,735,418 | A | * | 4/1998  | Erb et al. ............. 215/237 |
| 6,004,065 | A | * | 12/1999 | Higdon et al. ......... 403/384 |
| 6,467,850 | B1 | * | 10/2002 | Kawai et al. .......... 297/468 |
| 6,705,635 | B2 | * | 3/2004  | Hoeft et al. .......... 280/728.2 |
| 6,877,766 | B2 | * | 4/2005  | Mikolajewski ........ 280/728.2 |
| 7,216,891 | B2 | * | 5/2007  | Biglino ............... 280/728.2 |
| 7,225,592 | B2 | * | 6/2007  | Davis ................. 52/547 |

(Continued)

*Primary Examiner*—Paul N Dickson
*Assistant Examiner*—Drew Brown
(74) *Attorney, Agent, or Firm*—Thomas N. Twomey

(57) ABSTRACT

There is provided a bracket for securing a side airbag for an automotive vehicle. The bracket includes a bracket which connects a connection strap, connected to the side airbag, to a pillar of the vehicle, and wherein the bracket includes: an installation aperture to be secured to the pillar; and a fixing bracket aperture through which the connection strap connected to the side airbag passes, and wherein the fixing bracket aperture includes: a fixing bracket central aperture through which the connection strap passes; and extension apertures formed at both ends of the fixing bracket central aperture and each having a greater width than that of the fixing bracket central aperture.

7 Claims, 15 Drawing Sheets

U.S. PATENT DOCUMENTS

| | | | |
|---|---|---|---|
| 7,320,477 B2 * | 1/2008 | Kawabe et al. | 280/730.2 |
| 2003/0042712 A1 * | 3/2003 | Henderson et al. | 280/728.2 |
| 2003/0222435 A1 * | 12/2003 | Schmidt et al. | 280/728.2 |
| 2004/0012172 A1 * | 1/2004 | Deligny et al. | 280/728.2 |
| 2005/0029778 A1 * | 2/2005 | Weber et al. | 280/728.2 |
| 2005/0046154 A1 * | 3/2005 | Rhea et al. | 280/728.2 |
| 2007/0132224 A1 * | 6/2007 | Hall | 280/801.1 |

* cited by examiner

RELATED ART

RELATED ART

BRACKET FOR SECURING SIDE AIRBAG FOR AUTOMOTIVE VEHICLE

CROSS-REFERENCE TO RELATED APPLICATION

This application is a divisional application of U.S. Ser. No. 11/717,423, filed on Mar. 13, 2007, for bracket for securing side airbag for automotive vehicle, which claims the benefit of Korean Utility Model Application No. 2006-0006828, filed on Mar. 14, 2006, No. 2006-0007230, filed on Mar. 17, 2006, No. 2006-0008135, filed on Mar. 27, 2006, No. 2006-010369, filed on Apr. 18, 2006, and No. 2006-010629, filed on Apr. 20, 2006, the disclosure of which is hereby incorporated herein by reference in its entirety.

BACKGROUND OF THE INVENTION

1. Technical Field

The present invention relates to a bracket for securing a side airbag for an automotive vehicle and, more particularly, to a bracket for securing a side airbag for an automotive vehicle, which easily secures the side airbag and is prevented from being broken or deformed when it is fastened by a bolt.

2. Discussion of Related Art

In addition to a safety belt, generally, an airbag module installed in an automotive vehicle is a device for maximally protecting an occupant against injury when the automotive vehicle crashes.

An airbag module is typically installed in or around a steering wheel of a driver seat and in an instrument panel of a passenger seat. When an automotive vehicle crashes, the airbag module is operatively connected to a safety belt by a crash sensing sensor and an electronic control unit (hereinafter, referred to as "ECU"), and it maximally protects an occupant against injury.

That is, when an automotive vehicle crashes, the crash sensing sensor outputs a crash sensing signal to the ECU. The ECU determines whether to operate an airbag, depending on the intensity of the crash. If the airbag needs to be operated, the ECU operates an inflator to inflate the airbag.

In recent years, an airbag module has been installed at a side in an automotive vehicle, to protect an occupant upon a side impact crash.

The airbag module installed at the side of an automotive vehicle is generally called a 'side airbag.'

The side airbag is installed in an A-pillar which is connected from the front passenger seat to the back seat. When side impact is applied, the side airbag is inflated by the operation of the inflator.

In this application, a side airbag is used for an automotive vehicle, which prevents excessive inflation pressure from being applied to a lower end part of the side airbag to be deployed when the vehicle encounters a side crash, and balances the inflation pressure by an injected gas in a thorax bag and a head bag to reduce shaking when the side airbag is inflated and improves the work efficiency upon manufacture.

The constitution of a side airbag will be described, in brief, with reference to FIG. 1A. The side airbag comprises: a thorax bag 12 and a head bag 11 to be deployed upon a side crash. The thorax bag 12 comprises a mounting part 14 and a lower end part 16. The mounting part 14 has a neck shape at a rear side of the thorax bag 12. The lower end part 16 is formed at a distance from the mounting part 14.

An upper part and a lower part of the side airbag are formed symmetrically, based on the center of the mounting part 14. A tether 13 is positioned between the thorax bag 12 and the head bag 11. A vent aperture is formed in the side airbag at a distance from the mounting part 14. A pulling plate 15 is symmetrical with the thorax bag 12, and the thorax bag 12 is extended from the head bag 11.

The aforementioned side airbag is installed by fastening a bolt to the A-pillar of the automotive vehicle. To install the side airbag onto the A-pillar, additional securing devices are needed.

That is, a number of brackets, each having a securing aperture into which a bolt is inserted, are positioned at predetermined positions of the side airbag and are secured by fastening bolts.

An example of a conventional securing device of the aforementioned side airbag will be described with reference to FIG. 1B. A bracket 3a with a welding bolt 2a is welded at one side of a back part frame 1a. A back part 7a with a pad 5a covered by a cover 6a is positioned at one side of an installation space 4a of the side airbag.

The end of the cover 6a is inserted into the airbag installation space 4a. Therefore, one side of each of the airbag housing 8a and the airbag door 9a is positioned inside a support wire 10a, and the other side of each of the airbag housing 8a and the airbag door 9a is fixed to the welding bolt 2a of the bracket 3a.

However, since the conventional bracket for securing the side airbag is usually made of plastics, the bracket is broken or deformed while the bolt is fastened and therefore, the bracket cannot perform its function. Moreover, since this problem makes it impossible for the side airbag to be normally operated, an occupant is fatally injured.

Another conventional side airbag 30 comprises: an airbag which is installed inside a headlining of a roof side panel; an inflator which is installed at one side of the airbag and which has a gas generating material to deploy the airbag upon a side crash; and a guide member with one side end which is connected to the airbag and the other side end which is positioned to pivot around the roof side panel.

The constitution of the aforementioned side airbag 30 will be described, in detail, with reference to FIGS. 2A and 2B.

As described in FIGS. 2A and 2B, a headlining 21 is composed of plastics which are attached to the ceiling inside an automotive vehicle. Basic materials of the headlining 21 are the surface and pad with the functions, such as insulation from the roof, insulation of sound, or absorption of sound inside the vehicle and the like. The headlining 21 is formed integrally with these surface and pad.

As a device to perform an operation of deploying the side airbag 30, an inflator 40 rapidly burns a gas generating material including an element of sodium nitrite, and the like, by using an igniter and simultaneously generates nitrogen gas. The inflator 40 is secured to a roof side panel 25 by a separate bracket 41.

A strap 31 (hereinafter, referred to as "connection strap") is positioned at the other side of the inflator 40. The strap 31 prevents one side of the side airbag 30 from waving when the airbag 30 is deployed by the inflator. This is illustrated in FIG. 2B.

However, since the conventional side airbag has no specific structure to hold the connection strap, it is troublesome to assemble the side airbag in the A-pillar due to the interference between the A-pillar and the connection strap.

That is, an operator in a manufacturing site needs to check whether there is the interference with the connection strap when assembling the side airbag in the A-pillar. When the interference occurs, a process of avoiding the interference is added. As a result, a working time becomes longer and the assembling efficiency is deteriorated.

Further, as illustrated in FIG. 3A, a conventional bracket 50 for securing a side airbag has a shape in which a connection strap 52 is connected to a simply long rectangular aperture 51. Therefore, the bracket 50 is not properly connected to the connection strap 52.

That is, since the connection strap 52 is movable in the bracket 50, the connection strap 52 turns within the rectangular aperture 51 of the bracket 50, as illustrated in FIG. 3B.

Therefore, when the side airbag is mounted in an automotive vehicle, there are added a process of checking whether a state of the bracket is good or bad and, if the connection strap 52 turns, a process of returning the connection strap 52 to its original position. Consequently, the work becomes troublesome.

Moreover, the bracket 50 is pulled towards the side airbag due to momentary gas explosive power which is generated while the side airbag is operated upon an accident. In this case, the connection strap 52 inclines towards a lower part of the rectangular aperture 51 as illustrated in FIG. 3C. Consequently, the side airbag is not stably secured.

Moreover, when a connection strap 52 is cut by the friction caused during the accident, the side airbag is not inflated in a normal direction, upon the side crash.

Another conventional side airbag 60 will be described with reference to FIGS. 4A and 4B.

As illustrated in FIGS. 4A and 4B, the side airbag 60 comprises: a side airbag cushion 61, an inflator 62 supplying a gas to the side airbag cushion 61, a housing receiving the inflator 62, and a diffuser 64 included in the side airbag 60 and supplying a gas, which is generated from the inflator 62, to the side airbag cushion 61.

The inflator 62 is electrically connected to a control unit (not shown). The control unit is connected to a crash sensing sensor (not shown) in an automotive vehicle.

The side airbag cushion 61 is formed, at predetermined width and length, to sufficiently protect a head part of an occupant of the automotive vehicle. A tether 65 is provided in one part of an end of the side airbag cushion 61. The tether 65 guides the side airbag 60 to be broadly inflated lengthwise or widthwise when the side airbag 60 is deployed.

The diffuser 64 has a tube shape. A number of apertures (not shown) are formed, to be positioned lengthwise, on an outer circumference surface of the diffuser 64. While the diffuser 64 is received inside an upper end part of the side airbag 60, one end of the diffuser 64 is connected to the housing 63 receiving the inflator 62.

When the diffuser 64 and the housing 63 are connected to each other, a holder 66 fastens a part of the side airbag 60 which covers the connection part of the diffuser 64 and the housing 63, to be sealed.

A number of holders 67 are connected to the upper end of the side airbag 60, at a predetermined interval. The holders 67 secure the side airbag cushion 61 to a roof rail. The holders 67 cover an external surface of a side airbag housing 68 and temporarily hold the side airbag housing 68. The side airbag housing 68 covers the side airbag cushion 61 which is folded.

However, in the conventional side airbag 60, the holders 67 securing the side airbag 60 are formed of a single material. When the holders 67 are made of a soft material, an additional component is needed to prevent the holders 67 from being broken when the side airbag 60 is secured to the automotive vehicle by fastening a bolt. When the holders are made of a hard material to prevent the holders from being broken, there is a difficulty in cutting a cutting part when the side airbag 60 is deployed.

Further, in the aforementioned conventional side airbag 60, a space of each holder 67 is narrow and a shape of the holder 67 is gradually narrower downwardly. Therefore, since a region for supporting the side airbag 60 is narrow, many holders 67 are needed. This results in a longer working time in the manufacturing site.

That is, when the conventional side airbag 60 is mounted, since the additional components are needed and a number of holders 67 are installed, the assembling efficiency is lowered and the operability is not consistently provided by the defect of assembly.

SUMMARY OF THE INVENTION

Therefore, the present invention is directed to provide a bracket for securing a side airbag for an automotive vehicle, wherein an operator easily mounts the side airbag in a manufacturing site by preventing a connection strap from turning in an aperture of the bracket used for securing the side airbag, and wherein a failure in a securing structure is prevented.

Another aspect of the present invention is to provide a bracket for securing a side airbag for an automotive vehicle, wherein safety of a passenger is improved by normally absorbing side impact applied to the passenger upon an accident, by preventing a connection strip from being inclined towards one side when a bracket of the side airbag is distorted upon a crash, and by enabling a normal operation of the side airbag.

Exemplary embodiments of the present invention provide brackets for securing a side airbag for an automotive vehicle.

In accordance with an exemplary embodiment, a bracket for securing a side airbag for an automotive vehicle includes a bracket which connects a connection strap, connected to the side airbag, to a pillar of the vehicle, and wherein the bracket includes: an installation aperture to be secured to the pillar; and a fixing bracket aperture through which the connection strap connected to the side airbag passes, and wherein the fixing bracket aperture includes: a fixing bracket central aperture through which the connection strap passes; and extension apertures formed at both ends of the fixing bracket central aperture and each having a greater width than that of the fixing bracket central aperture.

Connection parts where the fixing bracket central aperture is connected to the extension apertures respectively may include a slope surface.

Hooking protrusions may be formed in corners of the connection parts where the fixing bracket central aperture is connected to the extension apertures; the hooking protrusions are respectively formed towards a length direction end of the fixing bracket.

Curved parts may be formed to be bulged towards a center of the fixing bracket central aperture, so that the width between both sides of the fixing bracket central aperture becomes gradually narrower towards the center of the fixing bracket central aperture.

A bending processed part may be formed between the installation aperture and the fixing bracket aperture of the fixing bracket.

The fixing bracket aperture may be formed at least at a portion of the bending processed part.

A hook may be formed at a side of the fixing bracket.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein.

FIRST EXEMPLARY EMBODIMENT

A first embodiment of the present invention will be described with reference to FIGS. 5A and 5B below.

Figure 1A:
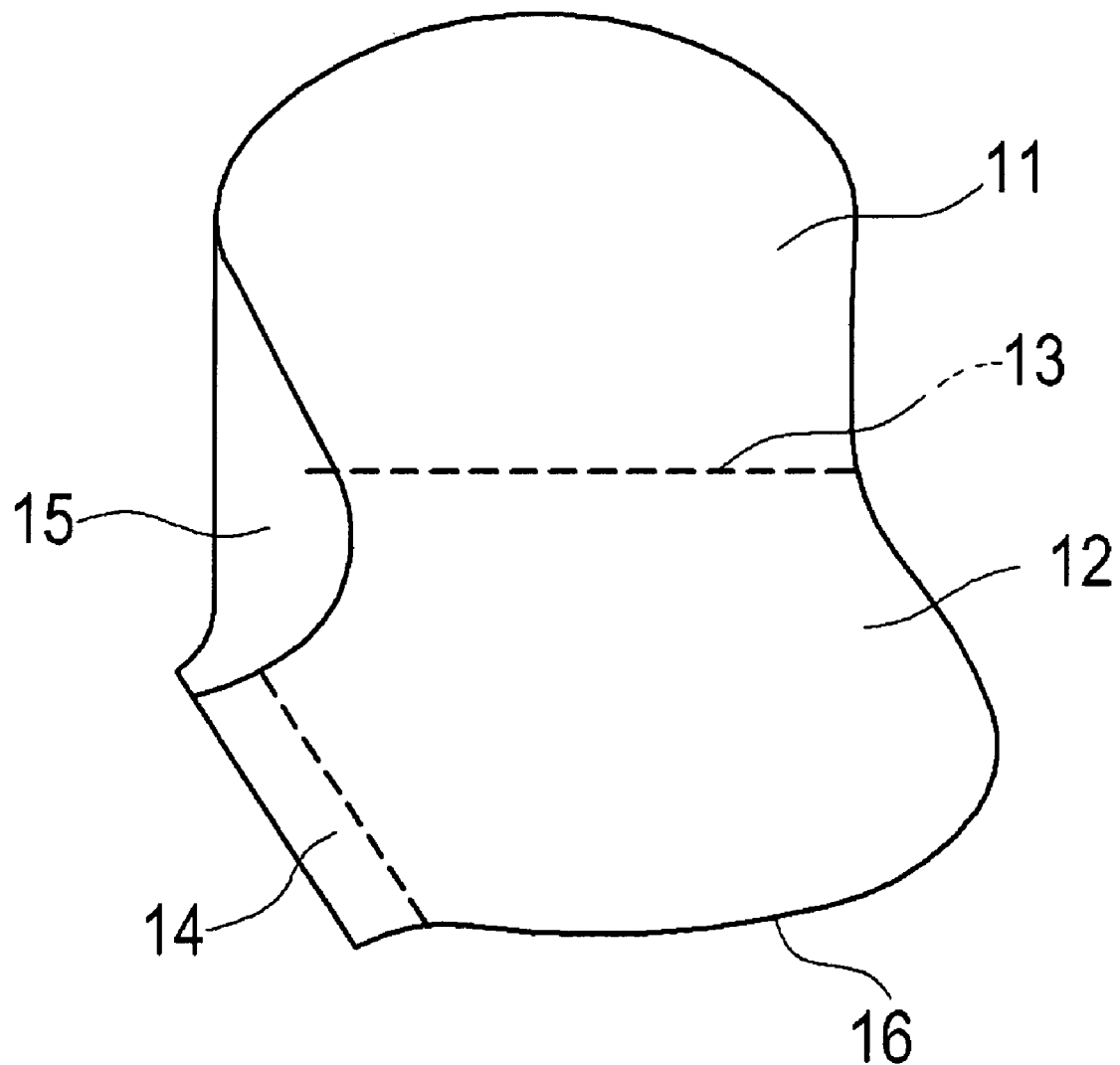
FIG. 1A shows an example of a conventional side airbag.
Figure 1B:
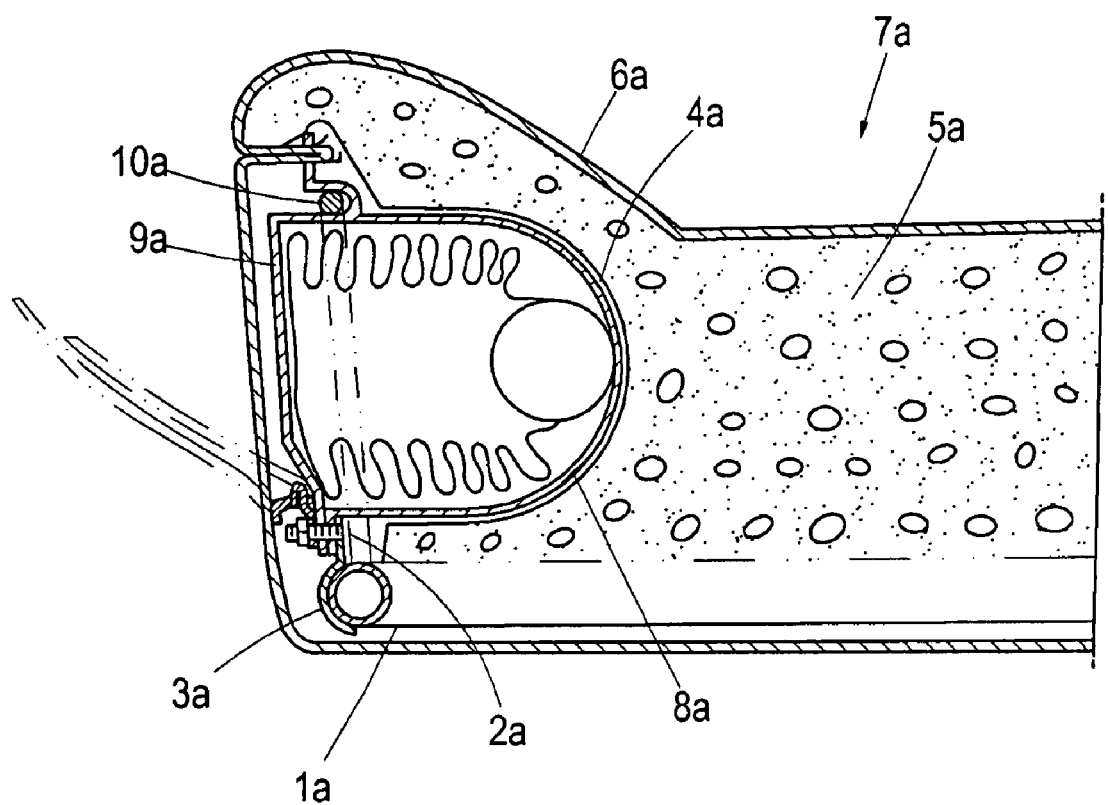
FIG. 1B shows an example of a conventional bracket for securing a side airbag.
Figure 2A:
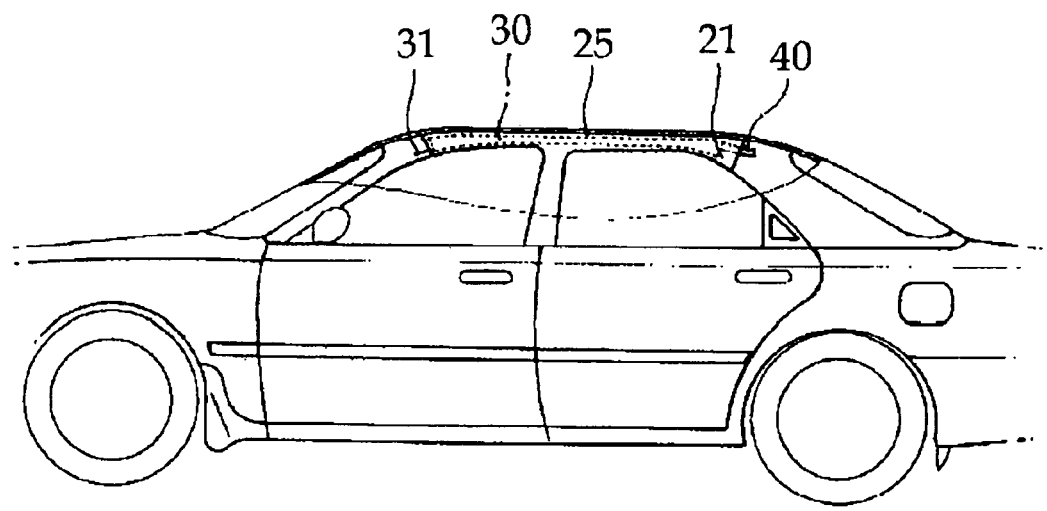
FIGS. 2A and 2B show an example of another conventional side airbag.
Figure 2B:
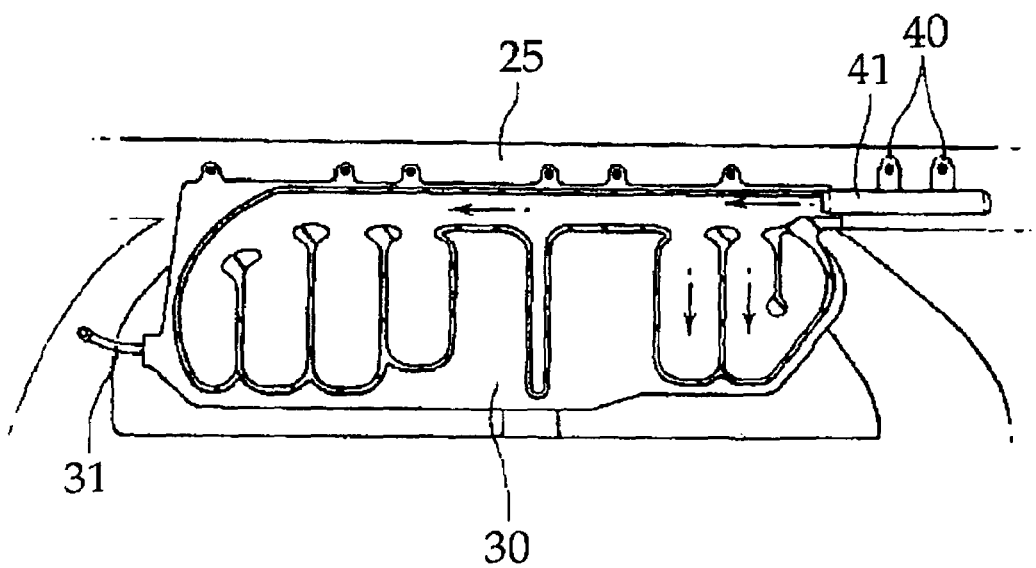
Figure 3A:
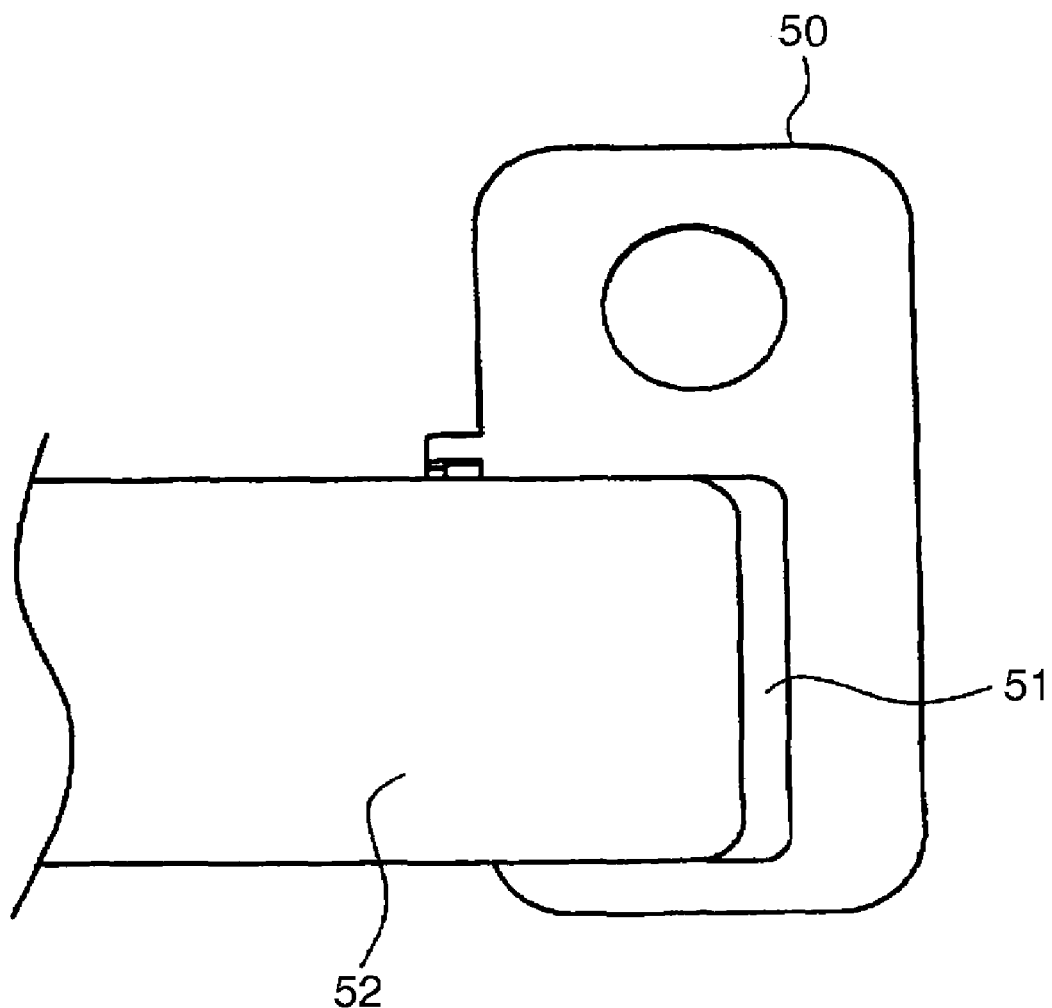
FIGS. 3A, 3B and 3C are front views of another conventional securing bracket.
Figure 3B:
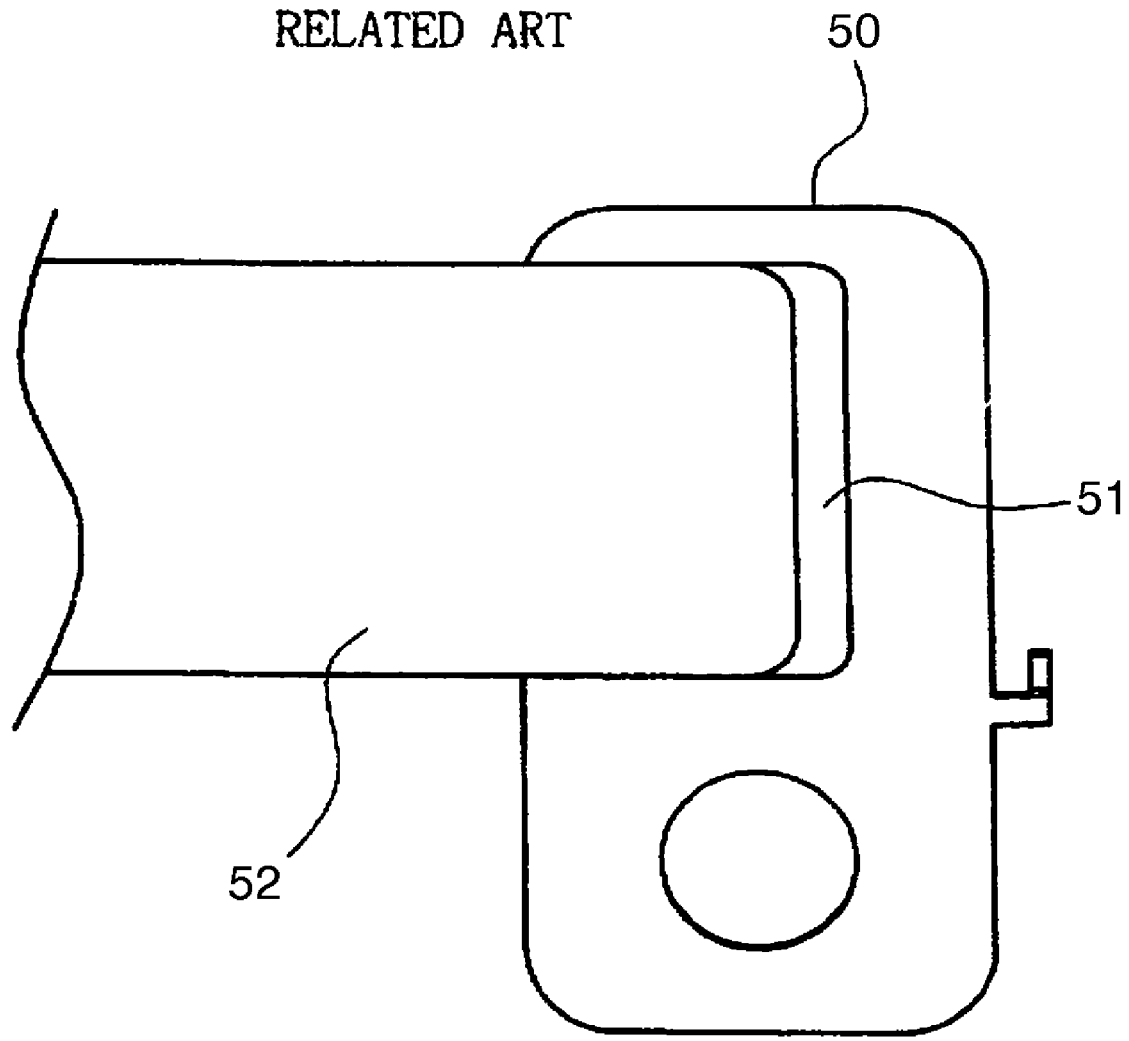
Figure 3C:
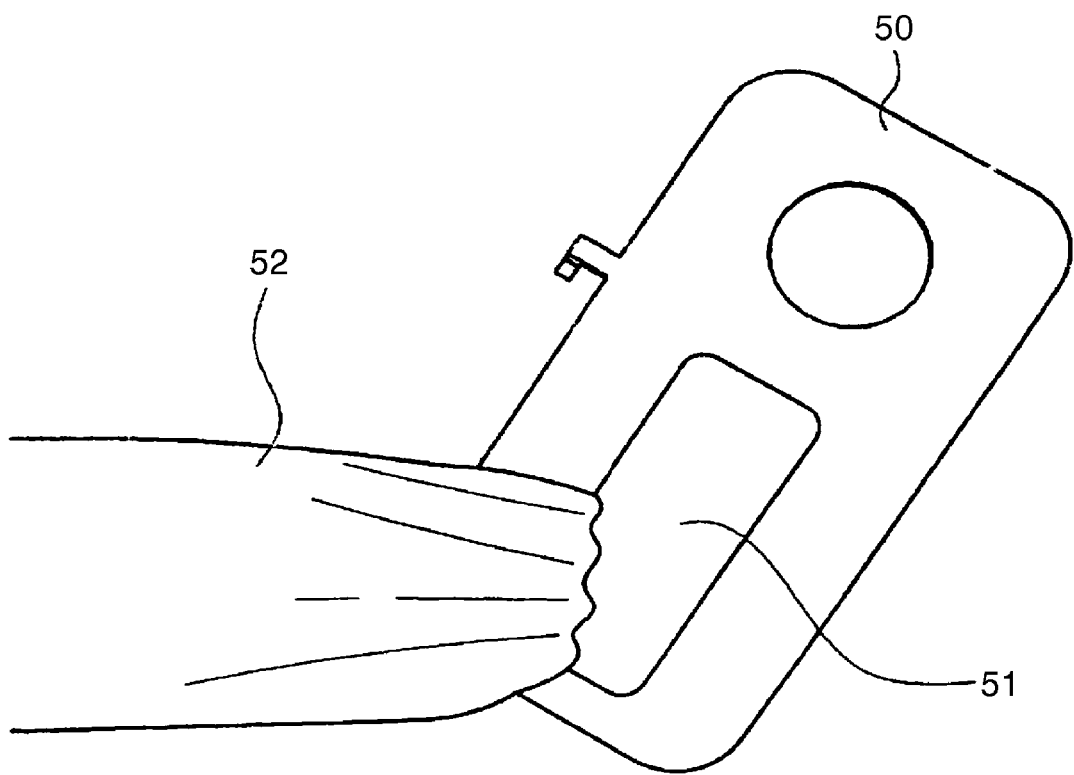
Figure 4A:
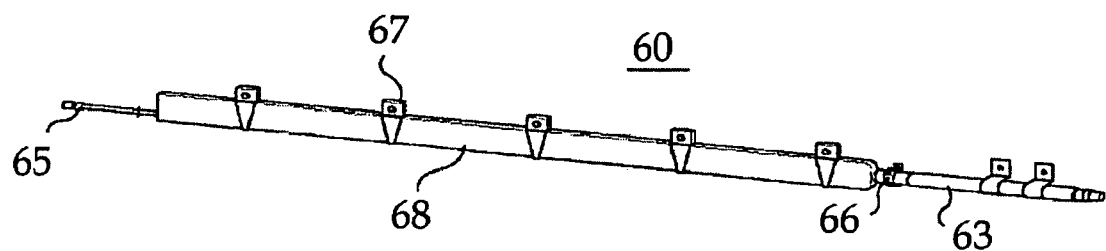
FIGS. 4A and 4B respectively show another conventional side airbag which is assembled and dissembled.
Figure 4B:
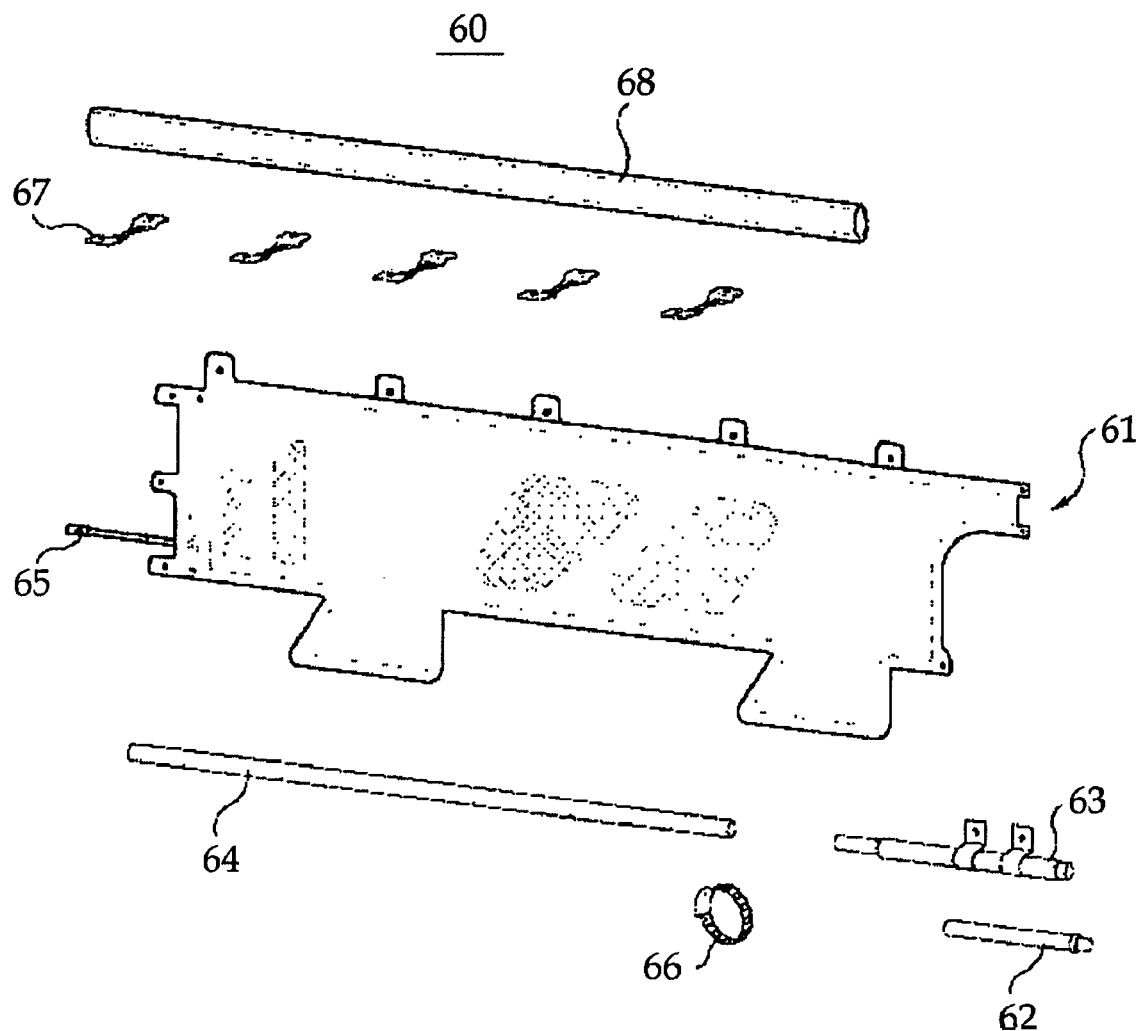
Figure 5A:
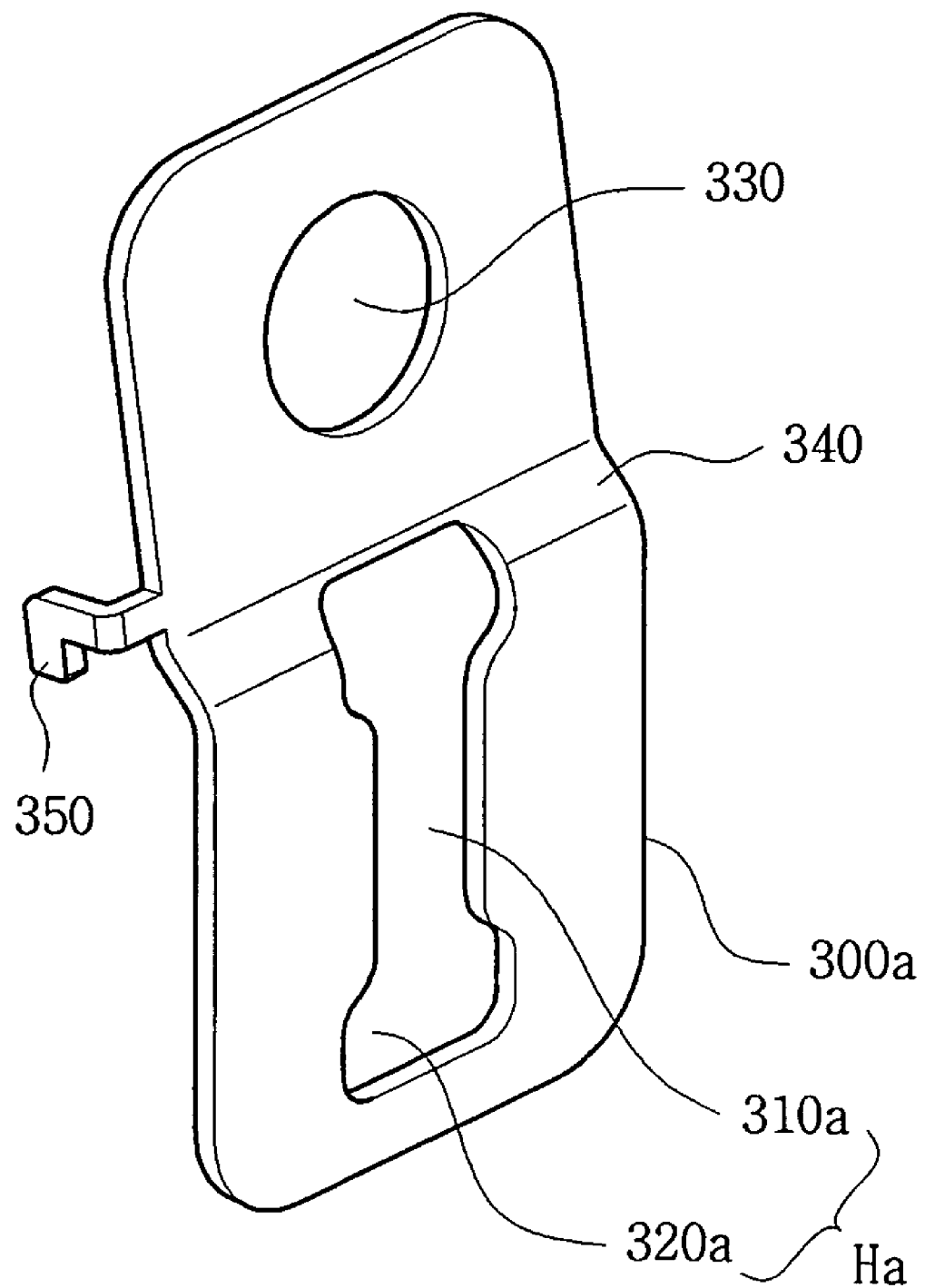
FIGS. 5A and 5B are perspective views of a bracket for securing a side airbag for an automotive vehicle according to a first exemplary embodiment of the present invention.
Figure 5B:
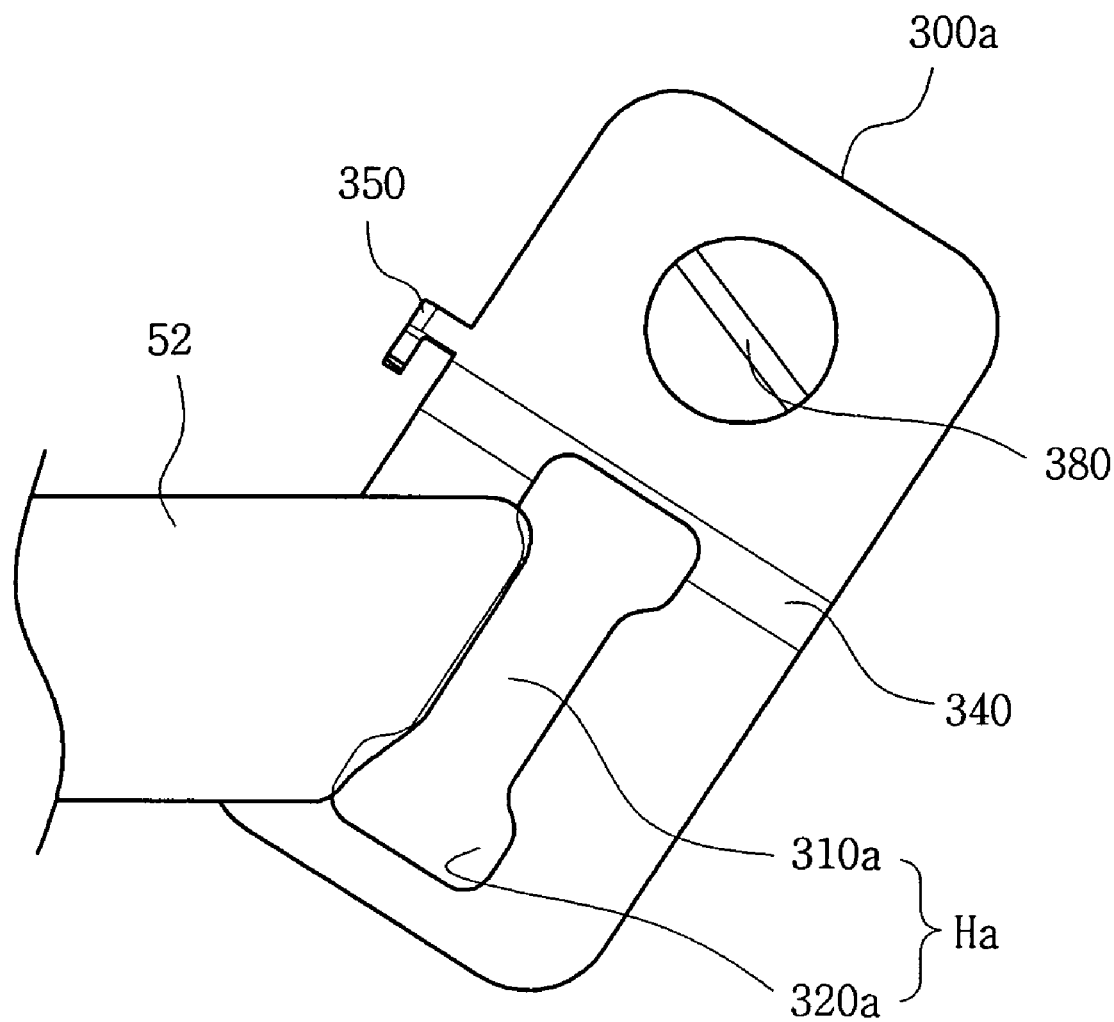

FIGS. 5A and 5B are perspective views of a bracket 300a for securing a side airbag for an automotive vehicle and a connection strap 52 connected to the bracket 300a.

An installation aperture 330 and a fixing bracket aperture Ha are formed inside the bracket 300a. The installation aperture 330 is to be secured to a pillar. The connection strap 52 connected to the side airbag passes through the fixing bracket aperture Ha. The fixing bracket aperture Ha includes a fixing bracket central aperture 310a and extension apertures 320a formed at both ends of the fixing bracket aperture Ha, to prevent the connection strap from turning. The width of the extension aperture 320a is greater than the width of the fixing bracket central aperture 310a.

As illustrated in FIG. 5A, the bracket 300a comprises the installation aperture 330, a hook 350, the fixing bracket aperture Ha and a bending processed part 340. The installation aperture 330 secures the bracket 300a to a body of the vehicle by fastening a bolt to a frame of the vehicle. The hook 350 is of help in fixing the body of the vehicle. The fixing bracket aperture Ha is connected to the connection strap 52. The bending processed part 340 is formed between a part where the installation aperture 330 is formed and a part where the fixing bracket aperture Ha is formed. The bending processed part 340 is formed at angles and results in a step to be easily installed.

Further the fixing bracket central aperture 310a is a long aperture in a rectangular form. The extension apertures 320a are formed at both ends of the long aperture. The width of the extension apertures 320a is greater than the width of the long aperture, i.e., the fixing bracket central aperture 310a. The connection parts between the extension apertures 320a and the fixing bracket central aperture 310a form a slope surface.

The two edges which are formed between the fixing bracket central aperture 310a and the extension apertures 320a restrains the movement of the connection strap 52, so that the bracket 300a does not turn before the side airbag is mounted in the vehicle. As a result, a failure is prevented.

When the side airbag is operated upon an unexpected accident during driving and even though the bracket 300a secured to the body of the vehicle by a bolt 380 is pulled towards the side airbag by the momentary explosive power of gas as shown in FIG. 5B, the connection strap 52 is maintained in the shape in which the connection strap 52 is first inserted into the fixing bracket aperture Ha. The connection strap 52 is not inclined toward one side or it is not cut.

When the side airbag is mounted in the vehicle in the manufacturing site, working is easy because there is no trouble of checking whether the condition of the bracket is good or bad and, if the bracket is turned, returning the bracket to its original position.

SECOND EXEMPLARY EMBODIMENT

Figure 6A:
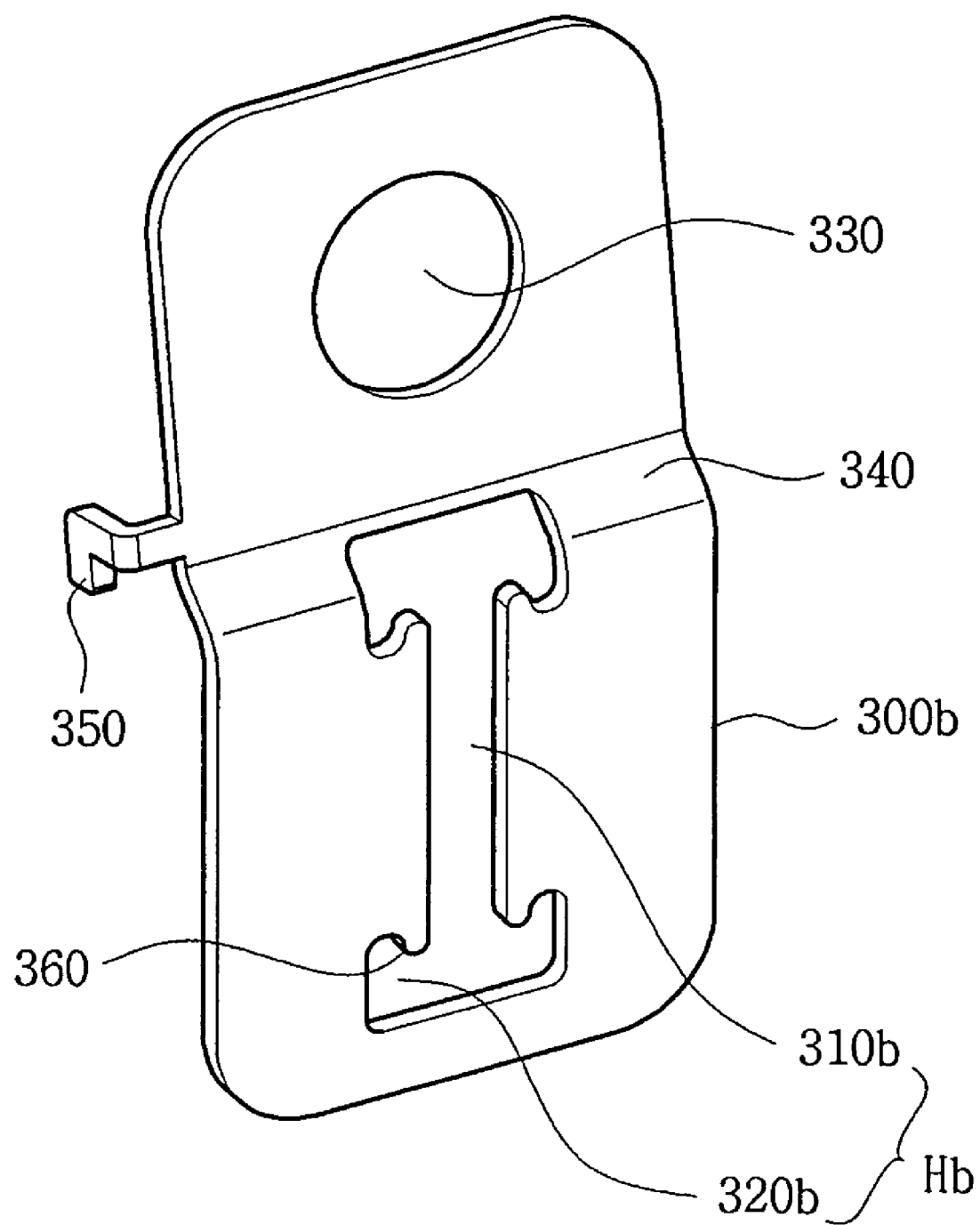
FIGS. 6A and 6B are perspective views of a bracket for securing a side airbag for an automotive vehicle according to a second exemplary embodiment of the present invention.
Figure 6B:
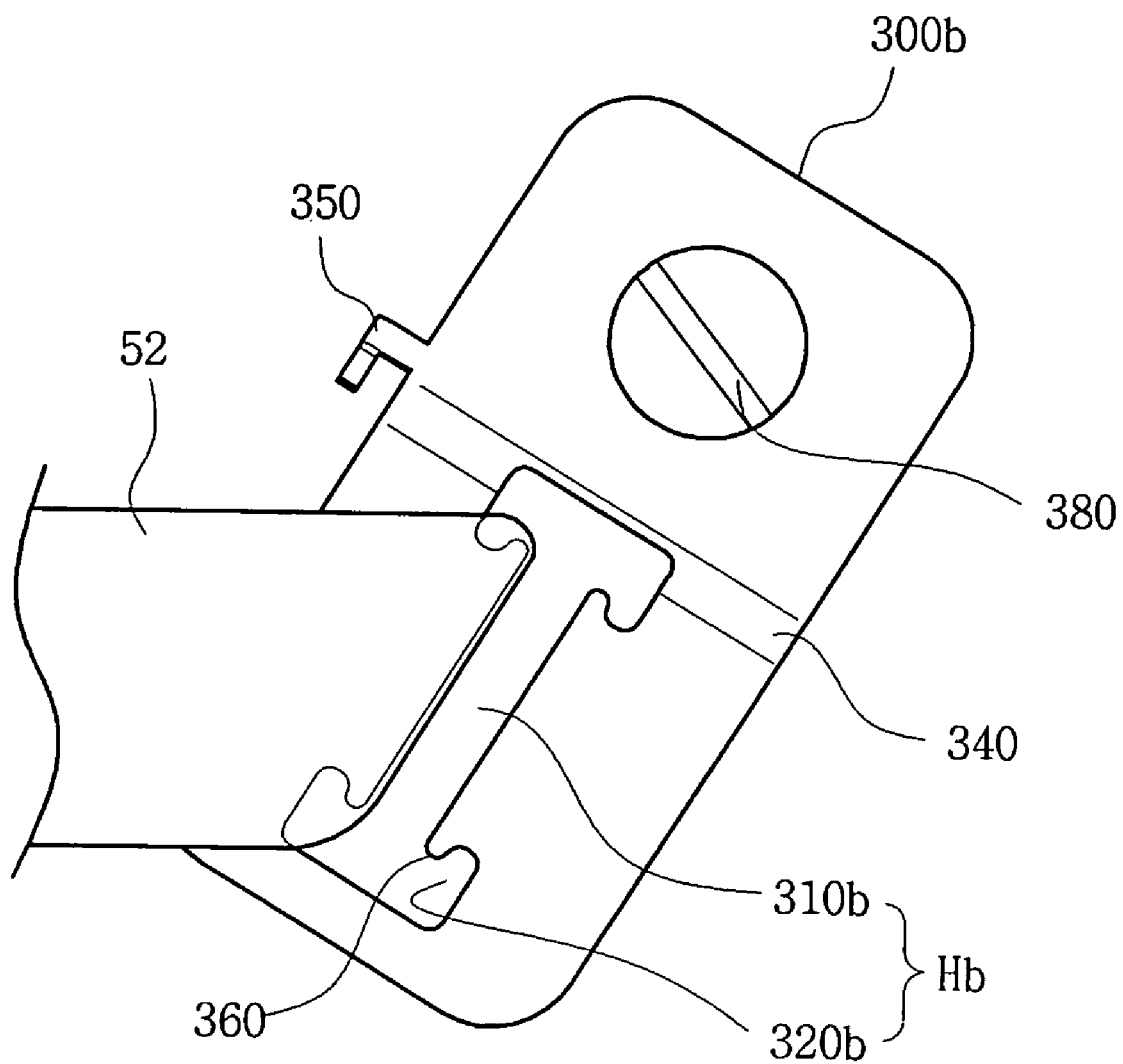

FIGS. 6A and 6B are perspective views of a bracket 300b for securing a side airbag for an automotive vehicle according to a second exemplary embodiment of the present invention.

The bracket 300b according to the second exemplary embodiment is similar to or same as the bracket 300a illustrated in FIGS. 5A and 5B, except for the shape of the fixing bracket aperture Hb. Therefore, the same reference numeral refers to the same element.

Four hooking protrusions 360 are formed around the connection parts where a fixing bracket central aperture 310b is connected to extension apertures 320b having the greater width than that of the fixing bracket central aperture 310b. When a connection strap 52 moves, the connection strap 52 is held by the hooking protrusions 360, thereby preventing the connection strap 52 from being folded upward or downward and from being reversely turned. Therefore, the connection strap 52 is firmly fixed to the bracket 300b.

THIRD EXEMPLARY EMBODIMENT

Figure 7A:
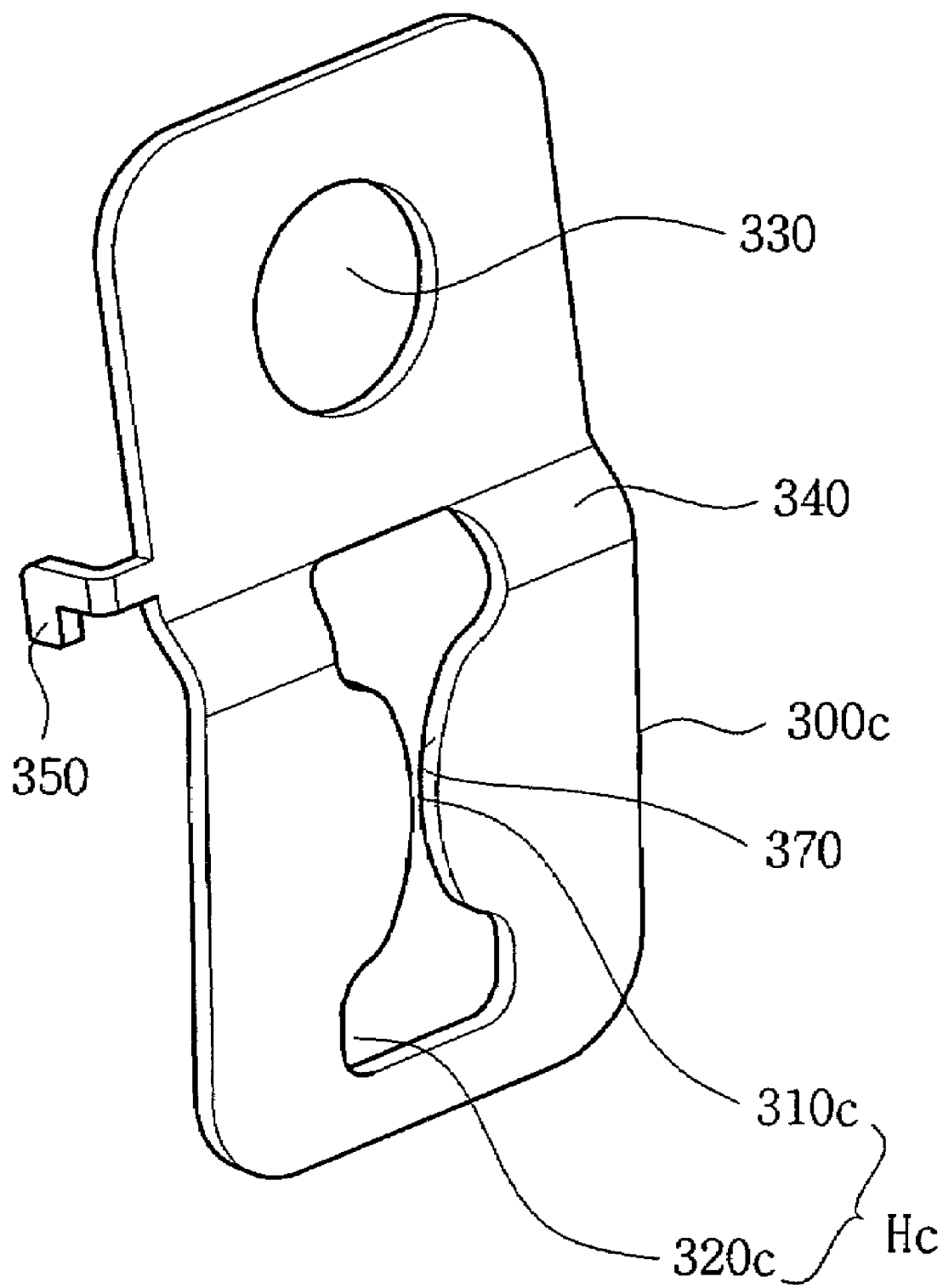
FIGS. 7A and 7B are perspective views of a bracket for securing a side airbag for an automotive vehicle according to a third exemplary embodiment of the present invention.
Figure 7B:
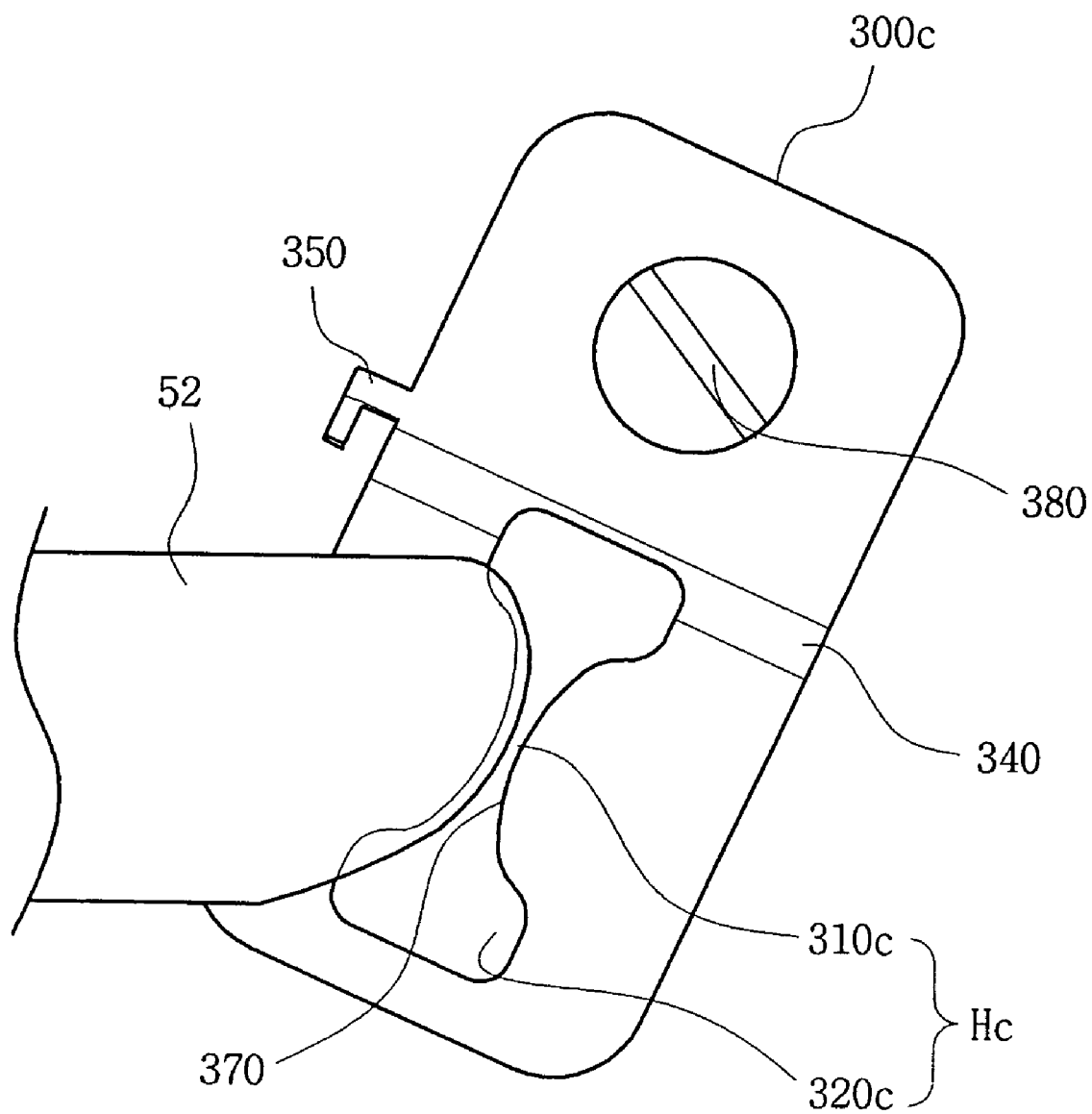

FIGS. 7A and 7B are perspective views of a bracket 300c for securing a side airbag for an automotive vehicle according to a third exemplary embodiment of the present invention.

The bracket 300c according to the third exemplary embodiment is similar to or same as the bracket 300a illustrated in FIGS. 5A and 5B, except for the shape of the fixing bracket aperture Hc. Therefore, the same reference numeral refers to the same element.

In the third exemplary embodiment, both sides of a fixing bracket central aperture 310a, which are opposite to each other lengthwise, are curved to bulge towards the center of the fixing bracket central aperture 310a. That is, the width of the fixing bracket central aperture 310a becomes progressively narrower toward the middle part thereof.

In accordance with the above-described present invention, the connection strap 52 connected to the side airbag is prevented from being folded or inclined downward. Therefore, a passenger is protected by installing the is bracket 300 (300a, 300b, and 300c) which enables the side airbag to be properly operated upon a side crash of the vehicle.

In the bracket for securing a side airbag for an automotive vehicle according to the exemplary embodiment of the present invention, since the connection strap connected to the bracket is prevented from turning, a failure is prevented while the side airbag is mounted. Further, even though the bracket is turned by the force generated when the mounted side airbag is operated upon an unexpected accident, since the fixing string is secured, it is prevented from being overlaid or inclined towards one side so that the side airbag is normally operated.

Furthermore, since the side airbag can be easily mounted in the manufacturing site, the working time is shortened and the productivity is improved.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. A bracket for securing a connection strap of a side airbag to a pillar of an automotive vehicle, said bracket comprising:
    an installation aperture for receiving a fastener for securing the bracket to the pillar, said installation aperture having a center; and
    a fixing bracket aperture through which the connection strap passes,
    wherein the fixing bracket aperture comprises:
    a fixing bracket central aperture elongated along a direction through the center of the installation aperture such that the connection strap is laterally disposed relative to the installation aperture, said fixing bracket central aperture having a central aperture width perpendicular to the direction; and
    extension apertures formed at both ends of the fixing bracket central aperture, each extension aperture having a width greater than the central aperture width.

2. The bracket according to claim 1, wherein the fixing bracket central aperture is connected to each extension aperture by a connection that includes a slope surface.

3. The bracket according to claim 1, wherein the fixing bracket central aperture is connected to each extension by a connection that includes a hooking protrusion that protrudes in the direction.

4. The bracket according to claim 1, wherein the fixing bracket central aperture includes curved sides that bulge inwardly, so that the width between both sides of the fixing bracket central aperture becomes gradually narrower towards the center of the fixing central aperture.

5. The bracket according to claim 1, wherein the fixing bracket further comprises a bending processed part between the installation aperture and the fixing bracket aperture.

6. The bracket according to claim 5, wherein the bending processed part includes at least at a portion of the fixing bracket aperture.

7. The bracket according to claim 1, wherein the fixing bracket further comprises a hook at a side of the fixing bracket.

* * * * *